United States Patent
Sproat et al.

(10) Patent No.: US 11,669,498 B2
(45) Date of Patent: Jun. 6, 2023

(54) FACILITATING EXCLUSIVE LOCAL LOCKS ON A DISTRIBUTED FILE SYSTEM

(71) Applicant: EMC IP Holding Company LLC, Hopkinton, MA (US)

(72) Inventors: Lisa Sproat, Seattle, WA (US); Douglas Kilpatrick, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 180 days.

(21) Appl. No.: 16/938,586

(22) Filed: Jul. 24, 2020

(65) Prior Publication Data
US 2022/0027322 A1   Jan. 27, 2022

(51) Int. Cl.
*G06F 16/176* (2019.01)
*G06F 16/182* (2019.01)
*G06F 9/52* (2006.01)

(52) U.S. Cl.
CPC .......... *G06F 16/1774* (2019.01); *G06F 9/526* (2013.01); *G06F 16/1824* (2019.01)

(58) Field of Classification Search
CPC .. G06F 16/1774; G06F 16/172; G06F 16/162; G06F 16/1824; G06F 9/30047; G06F 9/442; G06F 9/542; G06F 9/526
See application file for complete search history.

(56) References Cited

U.S. PATENT DOCUMENTS

| | | | |
|---|---|---|---|
| 5,596,754 A * | 1/1997 | Lomet | G06F 9/526 710/200 |
| 6,374,285 B1 * | 4/2002 | Scales | G06F 9/526 710/200 |
| 6,405,274 B1 * | 6/2002 | Chan | G06F 9/52 710/200 |
| 6,944,615 B2 | 9/2005 | Teng et al. | |
| 2002/0188605 A1 | 12/2002 | Adya et al. | |
| 2004/0068563 A1 | 4/2004 | Ahuja et al. | |
| 2006/0230411 A1 | 10/2006 | Richter et al. | |
| 2008/0168458 A1 | 7/2008 | Fachan et al. | |
| 2008/0177955 A1 | 7/2008 | Su | |
| 2008/0209433 A1 | 8/2008 | McKenney | |
| 2009/0210880 A1 | 8/2009 | Fachan et al. | |

(Continued)

OTHER PUBLICATIONS

Notice of Allowance dated Sep. 23, 2021 for U.S. Appl. No. 16/939,872. 43 pages.

*Primary Examiner* — Marc S Somers
(74) *Attorney, Agent, or Firm* — Amin, Turocy & Watson, LLP

(57) ABSTRACT

Facilitating exclusive local locks on a distributed file system is provided herein. An embodiment relates to a node device of a cluster of node devices. The node device can comprise a processor and a memory that stores executable instructions that, when executed by the processor, facilitate performance of operations. The operations can comprise determining at least one resource is to be removed from a cache of the node device. The operations also can comprise implementing an exclusive local lock over a defined lock. The defined lock can indicate interest in the at least one resource by other node devices of the cluster of node devices other than the node device. Further, the operations can comprise removing the at least one resource from the cache. The other node devices are not notified of the removing.

20 Claims, 10 Drawing Sheets

(56) References Cited

U.S. PATENT DOCUMENTS

| | | | |
|---|---|---|---|
| 2010/0114849 A1* | 5/2010 | Kingsbury | G06F 16/1774 |
| | | | 707/704 |
| 2010/0241774 A1 | 9/2010 | Olszewski et al. | |
| 2010/0275209 A1 | 10/2010 | Detlefs | |
| 2011/0191561 A1* | 8/2011 | Brassow | G06F 12/00 |
| | | | 711/E12.001 |
| 2012/0323872 A1* | 12/2012 | Vasquez Lopez | G06F 16/172 |
| | | | 707/704 |
| 2012/0331019 A1* | 12/2012 | Schreter | G06F 12/0866 |
| | | | 707/813 |
| 2014/0040218 A1* | 2/2014 | Kimura | G06F 16/2365 |
| | | | 707/704 |
| 2014/0365549 A1* | 12/2014 | Jenkins | G06F 9/5077 |
| | | | 709/201 |
| 2016/0314051 A1* | 10/2016 | Joshi | G06F 11/2097 |
| 2016/0364142 A1* | 12/2016 | Kanno | G06F 3/064 |
| 2017/0031730 A1 | 2/2017 | Greco | |
| 2017/0163760 A1* | 6/2017 | Wood | H04L 67/2842 |
| 2019/0324673 A1* | 10/2019 | Graefe | G06F 16/2343 |
| 2020/0081867 A1* | 3/2020 | Muniswamy Reddy | |
| | | | G06F 16/24552 |

* cited by examiner

FACILITATING EXCLUSIVE LOCAL LOCKS ON A DISTRIBUTED FILE SYSTEM

TECHNICAL FIELD

The subject disclosure relates generally to distributed file systems. More specifically, the subject disclosure relates to managing lock resources in distributed file systems.

BACKGROUND

Distributed storage systems and/or object storage systems can provide a wide range of storage services while achieving high scalability, availability, and serviceability. Operations of distributed storage systems and/or object storage systems can include a locking mechanism to maintain data consistency of the associated shared files. For example, shared and exclusive acquisition of a lock, where there can be multiple shared owners simultaneously, can be utilized as a pattern for the locking mechanism. However, this pattern can be costly for a distributed system with thousands of shared lockers, as a single thread taking an exclusive lock anywhere in the system can bring all shared lock requests to a halt until all existing shared owners release their locks.

The above-described context with respect to conventional storage systems is merely intended to provide an overview of current technology and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a node device of a cluster of node devices. The node device can comprise a processor and a memory that stores executable instructions that, when executed by the processor, facilitate performance of operations. The operations can comprise determining at least one resource is to be removed from a cache of the node device. The operations also can comprise implementing an exclusive local lock over a defined lock. The defined lock can indicate interest in the at least one resource by other node devices of the cluster of node devices other than the node device. Further, the operations can comprise removing the at least one resource from the cache. The other node devices are not notified of the removing.

In some implementations, removing the at least one resource from the cache can comprise determining that a reference count represented by a reference lock domain is zero. Further, in response to determining that the reference count is zero, the operations can comprise executing a function that processes the at least one resource according to a defined procedure.

Further, to the above implementations, the operations can comprise upgrading the exclusive local lock based on an activation of a contention callback indicator. In an additional, or alternative, implementation, the contention callback indicator can be triggered based on lock contention.

In accordance to some implementations, executing the function can comprise deleting the at least one resource. Alternatively, or additionally, executing the function can comprise writing information related to the at least one resource to a storage device. In some implementations, executing the function can comprise recycling the memory of the node device.

The at least one resource can be at least one file stored on a distributed file system. The cluster of node devices can be representative of nodes of a distributed file system.

Another embodiment relates to a method that can comprise determining, by a node comprising a processor and part of a group of nodes, that an object is to be unlinked at the node. Further, the method can comprise implementing, by the node, an exclusive local lock over a defined lock indicating interest in the object and unlinking, by the node, the object at the node.

The exclusive local lock can be considered a shared lock by a cluster-wide coordinator node and can be treated as an exclusive lock by an initiator of a local node. In an example, a first defined strength of the exclusive local lock on a local node can be similar to a second defined strength of a shared lock or delta lock at a cluster-wide coordinator node.

According to some implementations, implementing the exclusive local lock can comprise bypassing a call to a coordinator node of the group of nodes. Determining that the object is to be unlinked can comprise clearing cache during a shutdown operation performed at the node. In another example, determining that the object is to be unlinked comprises receiving a command to delete the object.

In some implementations, prior to implementing exclusive local lock, the method can comprise determining, by the node, that a context of an operation being performed on the object is an operation local to the node. In some implementations, the defined lock can allow one or more processes to lock the object. In an example, the defined lock can be a null lock.

Another embodiment relates to a non-transitory machine-readable medium, comprising executable instructions that, when executed by a processor, facilitate performance of operations. The operations can comprise determining that a cache is to be released from a first node device of a group of node devices, identifying an object for removal from the cache, and determining whether a contention callback is assigned to the object. The operations also can comprise implementing an exclusive local lock over a defined lock that indicates interest in the object by at least one second node device of the group of node devices, the at least one second node device being different than the first node device. Further, the operations can comprise removing the object from the cache. Implementing the exclusive local lock can comprise bypassing a coordinator node device of the group of node devices during the removing.

In an example, the exclusive local lock can be considered a shared lock by a cluster-wide coordinator node device and can be treated as an exclusive lock by an initiator of a local node device.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Example embodiments are directed to bypassing calls to a coordinator node for operations that are only relevant on a local node. To bypass calls to the coordinator node, exclusive local locks can be implemented over a null type lock. One example computing platform that can optionally incorporate the exclusive local lock techniques disclosed herein is an ISILON OneFS® cluster provided by DELL®, Inc. It can be appreciated that OneFS® clusters are one of many optional cluster computing technologies, any of which can incorporate the teachings of this disclosure.

Figure 1:
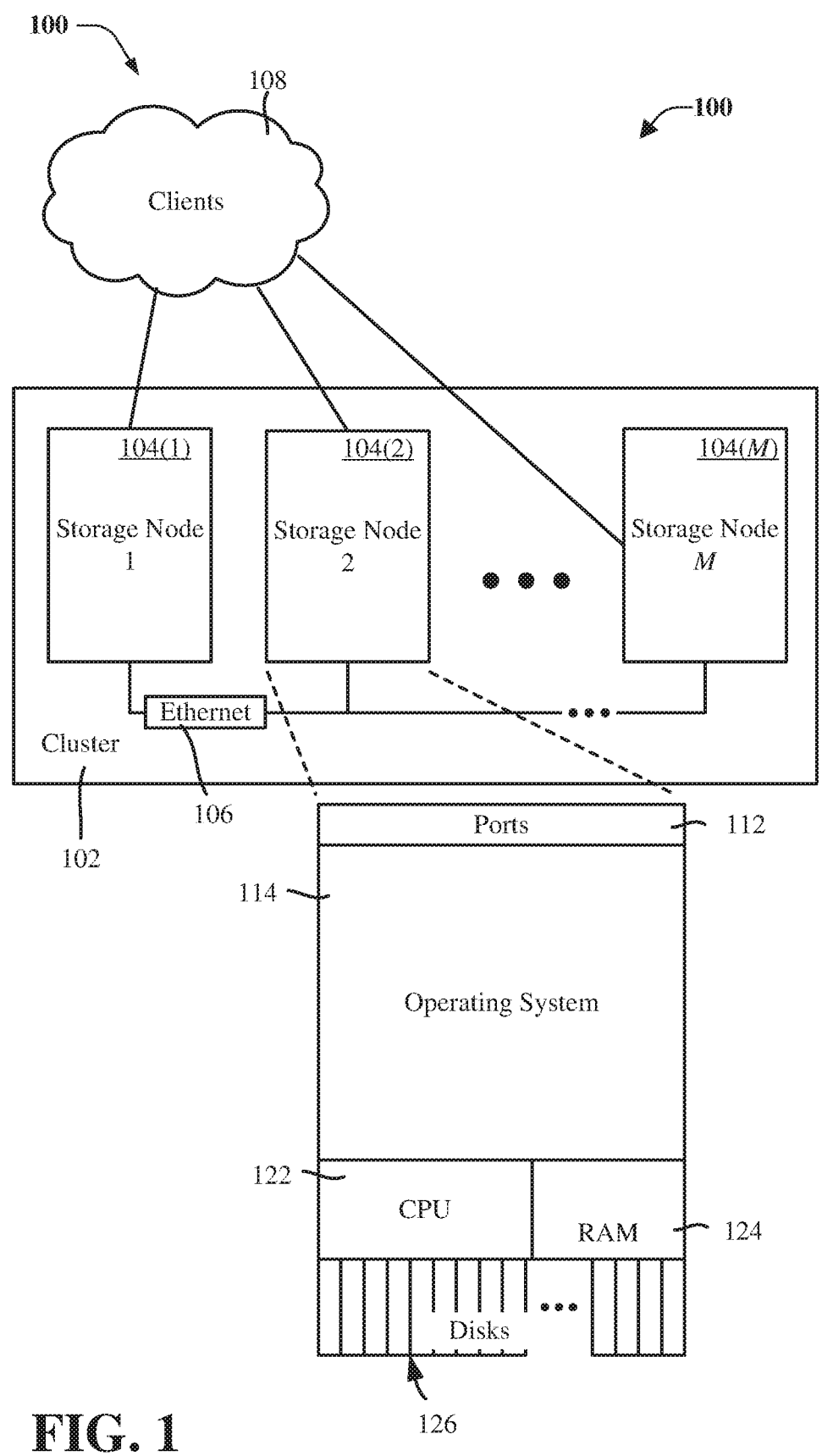
FIG. 1 illustrates an example cluster of computing devices, in accordance with one or more embodiments described herein.

FIG. 1 illustrates an example cluster of computing devices, in accordance with one or more embodiments described herein. FIG. 1 includes a cluster 102 of data node devices, referred to in FIG. 1 as storage nodes 104(1), 104(2) . . . 104(M), where M is a positive integer. Each storage node 104(1), 104(2) . . . 104(M) can comprise a computing device. Storage nodes 104(1), 104(2) . . . 104(M) can be configured to serve objects in response to requests from clients 108. Furthermore, typically one of the storage nodes 104(1), 104(2) . . . 104(M) can host a cluster controller virtual machine (not shown in FIG. 1), making that node the cluster controller node which administers the cluster 102. The storage nodes 104(1), 104(2) . . . 104(M) can be coupled to one other via a suitable data communications link comprising interfaces and protocols such as, but not limited to, Ethernet block 106.

Clients 108 can send data system-related requests to the cluster 102, which in general can be configured as one large object namespace. The cluster 102 can maintain an unlimited number of objects (e.g., up to trillions of objects or more). To this end, a node such as the node 104(2) generally comprises ports 112 by which clients 108 connect to the cluster 102. Example ports 112 are provided for requests via various protocols, including but not limited to SMB (Server Message Block), FTP (File Transfer Protocol), HTTP/HTTPS (Hypertext Transfer Protocol), and NFS (Network File System); further, SSH (Secure Shell) allows administration-related requests, for example.

Each node, such as the node 104(2), can include an instance of an operating system 114 (e.g., a OneFS® or other operating system). Each node, such as the node 104(2), can furthermore include a CPU 122, RAM 124, and storage devices such as disks 126. RAM 124 and disks 126 can comprise, for example, volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It is noted that cluster deployments can be of any size. Depending on the needs of a particular organization, some clusters can comprise five or fewer nodes, while large clusters can comprise much larger numbers of nodes. The technologies disclosed herein can be included in clusters of any size.

In a non-limiting example, OneFS® implements a two-tiered distributed locking system, referred to as "lk." The two-tiered distributed locking system means that locks for a resource are coordinated by a given node, referred to as a coordinator, which can be petitioned for locks by nodes, referred to as initiators, of behalf of threads on the initiator nodes. Thus, when a thread requires a lock to perform work on a resource, that request might need to not only go to it local initiator, but also be sent off-node to the cluster-wide coordinator for that resource before a lock can be granted and the thread can be unblocked.

On distributed systems, resources have cluster-wide arbitration, but can have arbitration on the local node only. An exclusive local lock, implemented on top of a cluster-wide shared-type lock, can manage such resources. However, when the local initiator does not already own a lock equal to or stronger than the requested lock, this still needs calls to the coordinator node to request a strong enough lock. For operations that are only relevant on the local node, the various embodiments discussed herein can bypass calls to the coordinator node by implementing exclusive local locks over a null type lock. Thus, the disclosed aspects have the potential to significantly improve performance of operations dependent on taking many exclusive local locks quickly, such as flushing caches and/or recycling vnodes on shutdown, and so on.

Conventionally, lock types supported by lk follow a shared-exclusive pattern. However, lk can support arbitrary types such as, for example, in the LIN domain for journal deltas and exclusive local locks. The null lock is a vacuous extension of all lock patterns. Null locks, by definition, are non-contentious with all other lock types and, by default, are owned automatically on each resource by all initiators managing said resource. Therefore, all initiators, by definition, have a null lock to grant. However, prior to implementation of the embodiments discussed herein, no work could be performed "under" a null lock since null locks do not protect from contention.

Exclusive local locks on top of a shared or delta lock already need an additional information field, relevant on the local node only, referred to as "contention type." This field is used by the initiator node only, to serialize local threads. An exclusive local lock can, therefore, be implemented as a shared lock with contention type "LK_CONTEND_ALL." The result is a lock that is understood as a shared lock by the cluster-wide coordinator but is treated as an exclusive lock by the local node's initiator.

To overcome the above noted challenges, the various aspects discussed herein can implement exclusive local locks as a NULL lock with contention type "LK_CONTEND_ALL." This can provide the same (or similar strength) on the local node as a shared lock or a delta lock with LK_CONTEND_ALL but does not need for the local initiator to request the cluster-wide coordinator for an exclusive local lock. This is because null locks are vacuously already owned by all initiator nodes. In scenarios where many locks need to be taken in quick succession, the disclosed embodiments can vastly improve performance, which can have a cascading effect by overall improving availability and performance of operations dependent on reboot performance (e.g., operation systems upgrades, firmware upgrades, and so on).

Figure 2:
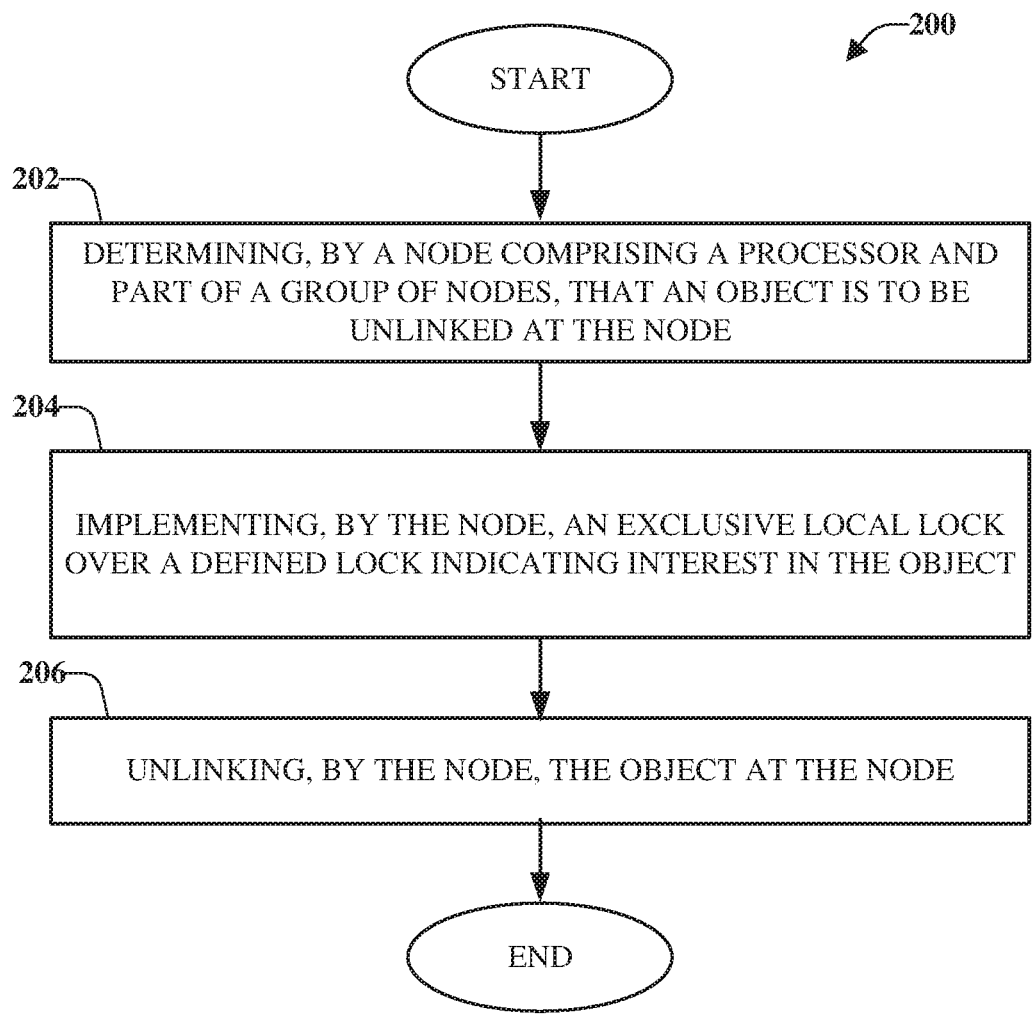
FIG. 2 illustrates a flow diagram of an example, non-limiting, computer-implemented method that implements an exclusive local lock over a defined lock in accordance with one or more embodiments described herein.

In further detail, FIG. 2 illustrates a flow diagram of an example, non-limiting, computer-implemented method 200 that implements an exclusive local lock over a defined lock in accordance with one or more embodiments described herein.

The computer-implemented method 200 starts, at 202 when a node determines that an object is to be unlinked at the node. The node can comprise a processor and can be part of a group of node devices. For example, the group of node devices can be nodes of a distributed file system. To determine the object is to be unlinked, the first node device can receive an explicit request to remove the object, such as a delete request or another request that specifically identifies the object and that the object should be removed (e.g., deleted or unlinked). In another example, the request can be an implicit request, such as an inference that an object has not been accessed in a defined amount of time and removal of the object can free-up memory resources or other resources. In a further example, the determination can be based on cleaning (or flushing caches during power down (or shutdown) and/or recycling virtual node (vnode) on power down (or shutdown), and so on.

At 204, an exclusive local lock can be implemented over a defined lock. The defined lock can be a lock that indicates interest in the object. According to an implementation, the defined lock can be a null lock. Further, at 206, the object can be unlinked at the node. The link to the object can be removed without the node notifying other nodes in the group of nodes of the link removal. Thus, no other nodes are aware (nor need to be aware) that the node has removed the link to the object from its cache. Accordingly, an advantage of the various embodiments discussed herein it that there is no need to send to and wait for the null lock from the distributed system.

It is noted that some operations need to take massive numbers of locks very quickly. The BSD VFS uses an exclusive VOP lock for vnode recycling. On a distributed system, taking a cluster exclusive lock in this use case can cause catastrophic performance degradation (exclusive local locks are utilized on ISILON OneFS® for this reason). These exclusive local locks, traditionally, were implemented by taking shared-type locks (in the case of the LIN domain for inodes (e.g., index nodes), the locks were implemented using delta read locks, which are a specialized type of shared lock). This is functional, but uses unnecessary calls to lk coordinator off the local node in order to obtain a lock that is only truly relevant on the local node. By taking a null lock in the distributed system, which can block nothing, and using the CONTEND_ALL contention type locally, local consistency can be obtained while granting locks significantly faster. For example, there is no need to send to, and wait for, the null lock from the distributed system according to the various embodiments discussed herein.

It is further noted that flags that control local contention to the function in question include "LK_CONTEND_NONE," "LK_CONTEND_NORMAL," "LK_CONTEND_SELF," and "LK_CONTEND_ALL." LK_CONTEND_NONE is the opposite of what is describe herein with respect to the various embodiment and indicates to not take any locks on a specific system, but do take locks in the cluster-wide system, and is used for pinning a lock to the node for caching purposes. CONTEND_NORMAL is a normal function. CONTEND_SELF is irrelevant in the context of the embodiments discussed herein. Further, CONTEND_ALL indicates that it does not matter how shareable the lock is normally, block everyone else from this node, which is utilized with the disclosed embodiments.

Figure 3:
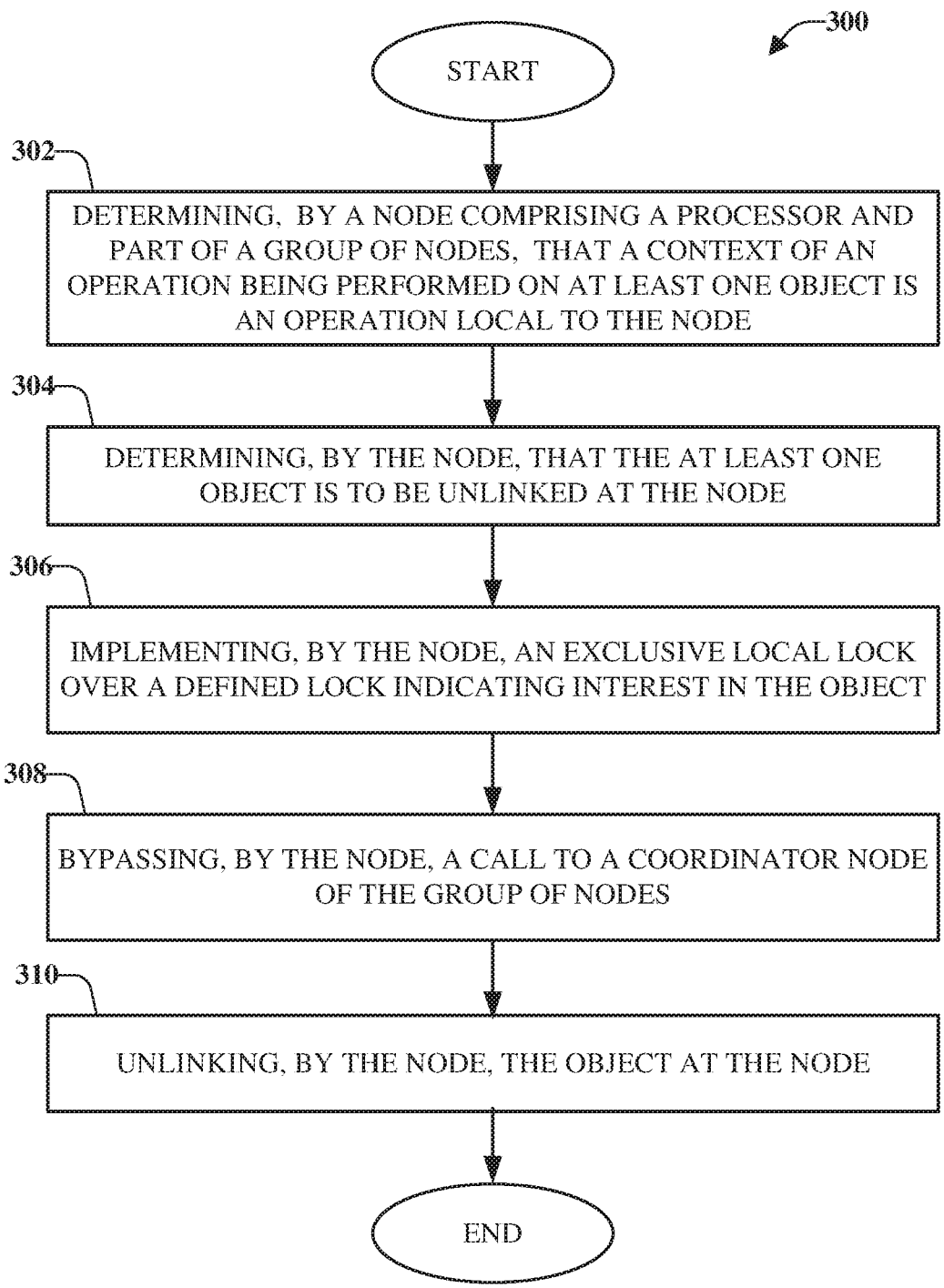
FIG. 3 illustrates a flow diagram of an example, non-limiting, computer-implemented method that implements an exclusive local lock for operations local to a node in accordance with one or more embodiments described herein.

FIG. 3 illustrates a flow diagram of an example, non-limiting, computer-implemented method 300 that implements an exclusive local lock for operations local to a node in accordance with one or more embodiments described herein.

At 302, it is determined by a node that a context to an operation performed on an object is an operation local to the node. For example, the operation local to a node can be releasing cache of the node during a shutdown procedure. The node can comprise a processor and can be part of a group of node devices.

Further, at 304 of the computer-implemented method, the node can determine that at least one object is to be unlinked at the node. In some implementations, the determination can be based on clearing cache during a shutdown operation performed at the node. According to some implementations, the determination can be based on receipt of a command to delete the object.

To determine the object is to be unlinked, the node can receive an explicit request or an implicit request to remove the object. The explicit request can be a delete request, which can be received based on a determination that the object is no longer needed. In an example, the delete request can be received from an entity. As utilized herein an entity can be one or more computers, the Internet, one or more systems, one or more commercial enterprises, one or more computers, one or more computer programs, one or more machines, machinery, one or more users, one or more customers, one or more humans, and so forth, hereinafter referred to as an entity or entities depending on the context.

The implicit request can be based on rules and/or policies associated with objects. For example, the object can be marked for removal or deletion based on inactivity of the object at the first node device and based on a determination that the object can be retrieved from another source if the object is needed in the future. The determination of when to remove or unlink files can be based on various criteria including storage capabilities or other resource capabilities associated with the first node and/or other nodes of the group of nodes.

At 306, an exclusive local lock can be implemented over a defined lock. Implementation of the exclusive local lock over the defined lock can include, at 308, bypassing, by the node, a call to a coordinator node of the group of nodes. The defined lock can allow one or more processes to lock the object. For example, the defined lock can be a null lock.

According to some implementations, the exclusive local lock can be considered a shared lock by a cluster-wide coordinator node and can be treated as an exclusive lock by an initiator of a local node. According to some implementations, a first defined strength of the exclusive local lock on a local node can be similar to a second defined strength of a shared lock or delta lock at a cluster-wide coordinator node.

Figure 4:
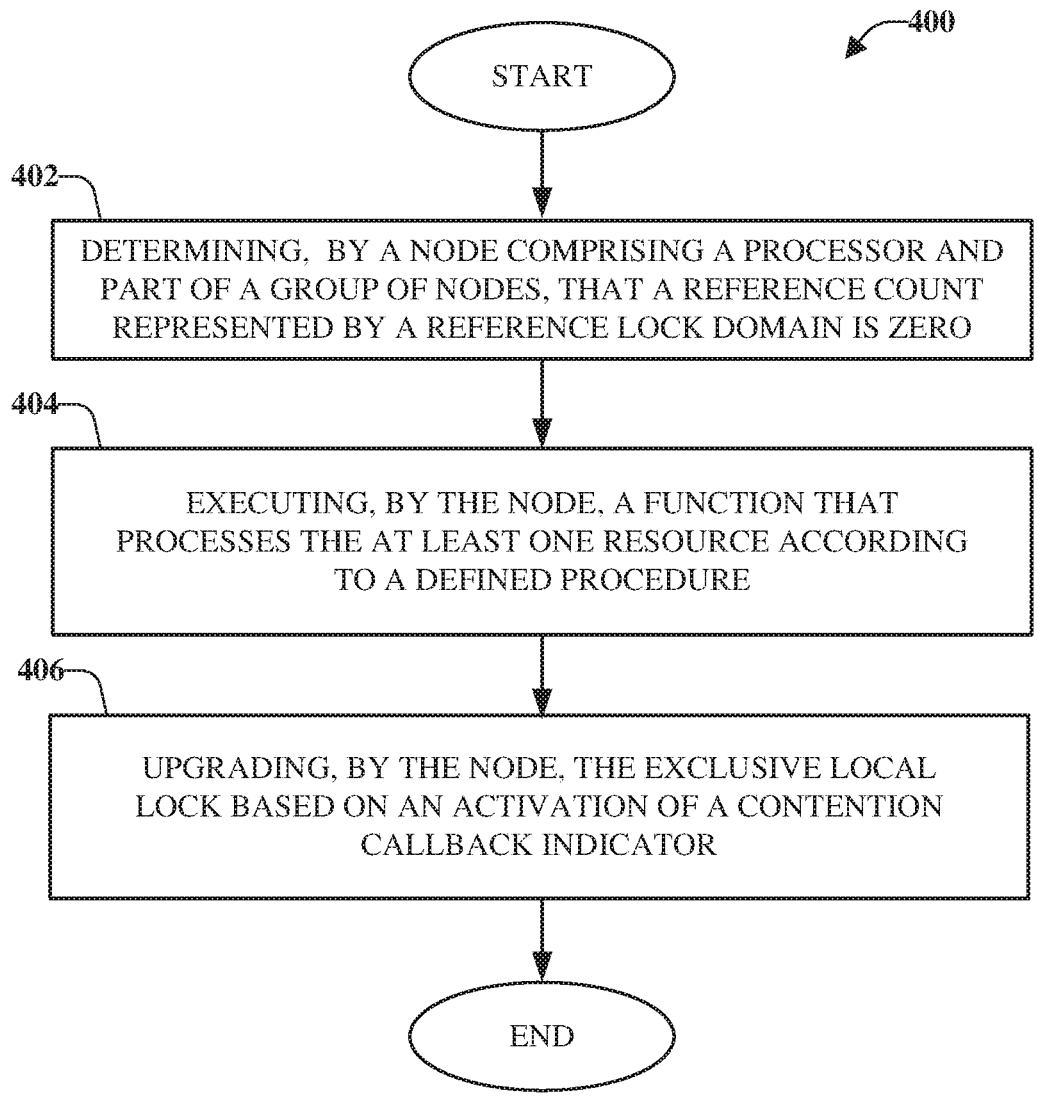
FIG. 4 illustrates a flow diagram of an example, non-limiting, computer-implemented method that upgrades an exclusive local lock for operations local to a node based on an activation of a contention callback indicator in accordance with one or more embodiments described herein.

FIG. 4 illustrates a flow diagram of an example, non-limiting, computer-implemented method 400 that upgrades an exclusive local lock for operations local to a node based on an activation of a contention callback indicator in accordance with one or more embodiments described herein.

Since null locks already have a system definition, overloading the null locks with the context of an exclusive local locks needs some consideration regarding the meaning of an exclusive local lock. Further, handling cases where a null lock is not sufficiently powerful to perform required work is also needed.

Accordingly, at 402 of the computer-implemented method, a node can determine that a reference could represented by a reference lock domain is zero. The node can comprise a processor and can be part of a group of node devices. The "reference count" can drop to zero on a vnode. For example, on OneFS®, reference counts are represented by the reference lock domain. Further, shared reference locks do not contend with one another. However, exclusive reference locks content with all exclusive locks or shared reference locks. Exclusive reference locks are used to delete files under.

Based on the reference count dropping to zero, at 404, a function can be executed that processes at least one resource according to a define procedure. The at least one resource can be a resource included in a cache of the node device. For example, the at least one resource can be at least one object, at least one file, or at least one other item. In a non-limiting example, the at least one resource can be at least one file stored on a distributed file system.

According to some implementations, executing the function can comprise deleting the at least one resource. In some implementations, executing the function can comprise writing information related to the at least one resource to a storage device. Executing the function can comprise, according to some implementations, recycling the memory of the node device.

In an example, the function can be referred to as bam_inactive and, when called, can determine whether to delete the at least one resource, write the dirty data (associated with the at least one resource) back to disk, or just recycle the memory of the inode.

Further, at 406 of the computer-implemented method, the node can, optionally, update the exclusive local lock based on an activation of a contention callback indicator. For example, a delta read lock is sufficient to try to delete the inode under, however, a null lock is not. Therefore, an exclusive local lock implemented over a null lock should be upgraded first.

Figure 5:
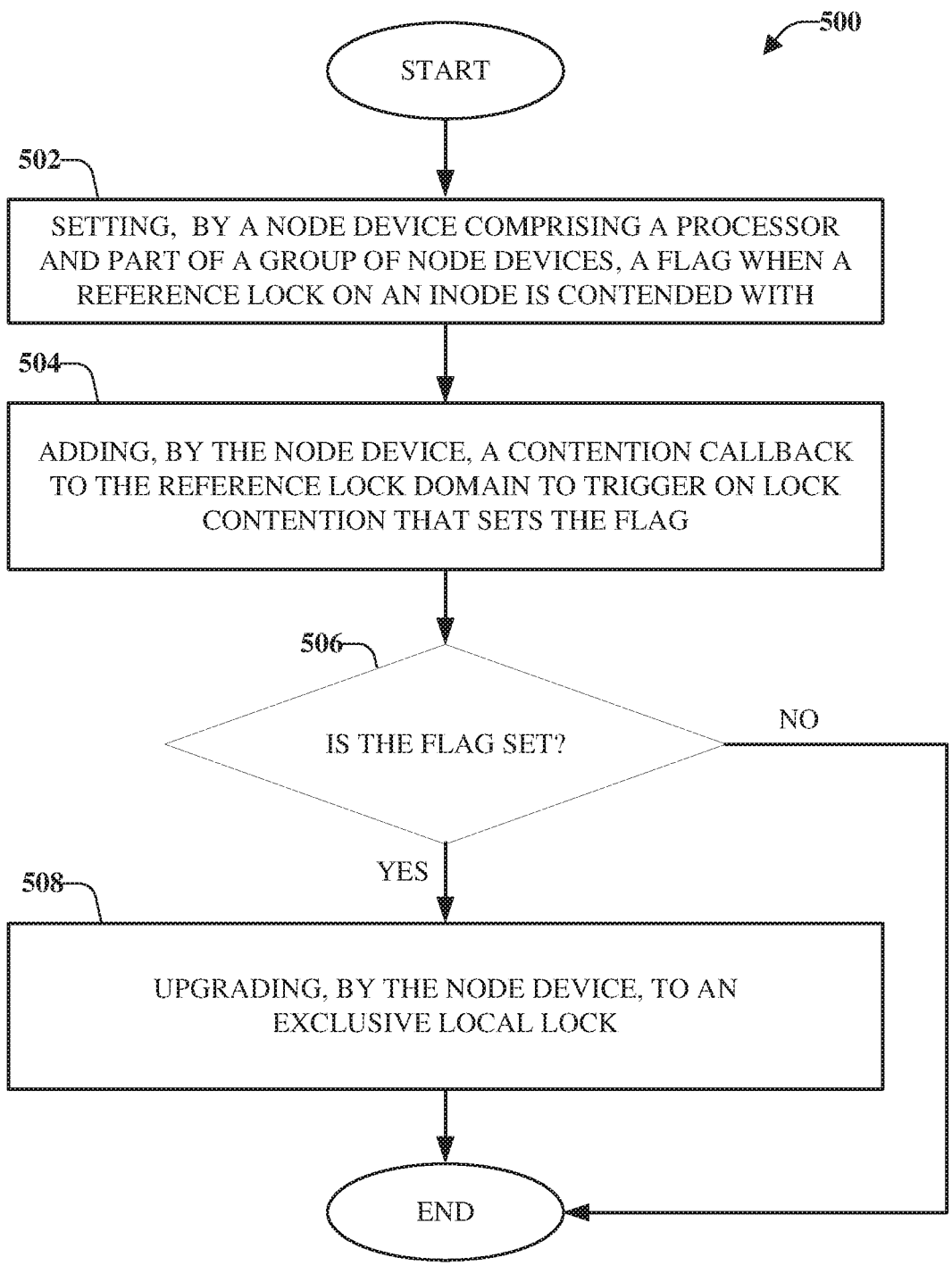
FIG. 5 illustrates a flow diagram of an example, non-limiting, computer-implemented method for upgrading an exclusive local lock in accordance with one or more embodiments described herein.

FIG. 5 illustrates a flow diagram of an example, non-limiting, computer-implemented method 500 for upgrading an exclusive local lock in accordance with one or more embodiments described herein.

It is noted that upgrading an exclusive local lock is optional. If an upgrade is not performed, best case performance can be still significantly better than asking the coordinator node for every lock and worst case performance is no worse (e.g., does not change).

The computer-implemented method 500 starts, at 502, when an indicator is sent when a reference lock on an inode is contended with. For example, the reference lock is contended with when a thread tried to take an exclusive reference lock. The indicator can be a flag associated with a data structure that defines the object. The data structure can be an index node definition. For example, the indicator could be in a first state or a second state. The first state can indicate that the thread tried to take an exclusive reference lock and the second state can indicate that the thread has not tried to take an exclusive reference lock (or vice versa). In an example, the first state can be an active state and the second state can be an inactive state (or vice versa). In another example, the first state can be a binary state of "1" and the second state can be a binary state of "0" (or vice versa).

Further, at 504, a contention callback can be added to the reference lock domain to trigger on lock contention that sets the flag. It is not necessary to relinquish the shared reference lock. Instead, when the shared lock is later dropped, and the reference count goes to zero, at 506, a determination is made whether the flag is set in bam_inactive (e.g. is the flag set?). If the flag is set ("YES"), at 508, the node upgrades to exclusive local lock. If the flag is not set ("NO") the exclusive local lock is not upgraded. This can improve a workflow around reference locks, as well as making it possible to use a null lock in this context.

Numerous routines assert that the lock type that is needed for the work being performed is actually held. When an exclusive local lock is implemented over a delta read lock, the assertion that "a lock stronger than or equal to a delta read lock is held" is a valid assertion that covers exclusive local cases. However, existing VOP_LOCKED assertions do not account properly for exclusive local locks implemented over null locks. Therefore, a new assert function, ASSERT_VOP_LLOCKED, can be written to check for either "a lock stronger or equal to a cluster-wide delta read lock" or "a lock stronger than or equal to an exclusive local lock." This assert can replace existing ASERT_VOP_LOCKED assertions in functions where an exclusive local lock is sufficient. With this change, further contributors to this area can be clear on what level of lock is needed for their routines on a cluster-wide scale.

The contention callback can be on the delete lock domain and can be set whenever another node attempts to upgrade to an exclusive delete lock while a shared lock is held. The contention callback can set a flag on the referenced inode to mark the node for further deletion. The flag can be a new flag added in order to facilitate delete lock contention as discussed in this disclosure.

Figure 6:
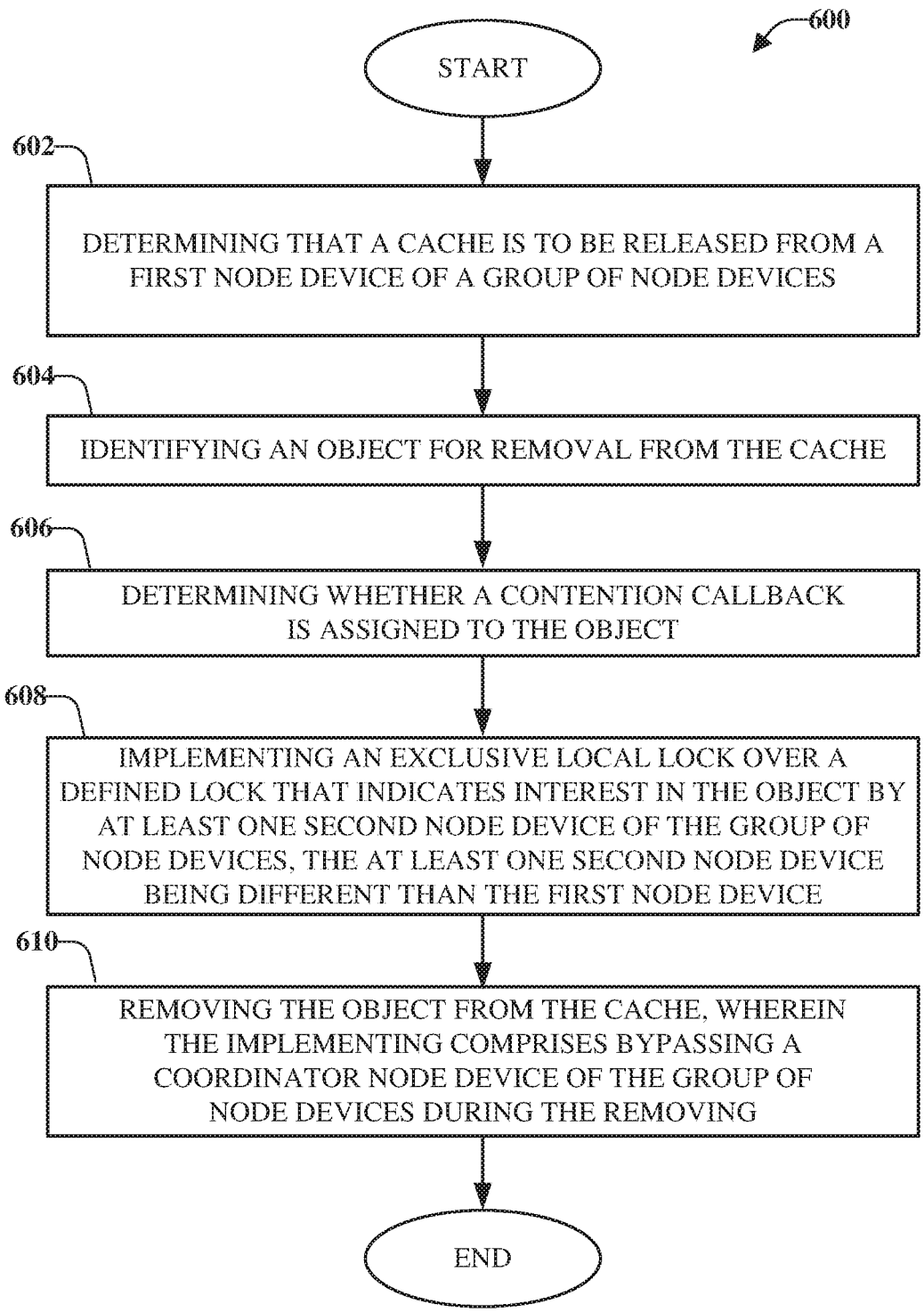
FIG. 6 illustrates a flow diagram of an example, non-limiting, computer-implemented method for facilitating exclusive local locks on a distributed file system in accordance with one or more embodiments described herein.

FIG. 6 illustrates a flow diagram of an example, non-limiting, computer-implemented method 600 for facilitating exclusive local locks on a distributed file system in accordance with one or more embodiments described herein.

The computer-implemented method 600 starts, at 602, when it is determined that a cache is to be released from a first node device of a group of node devices. For example, the cache can be released during shutdown or during other times. At 604, an object is identified for removal from cache. According to some implementations, more than one object can be identified. In another implementation, all objects (or a portion thereof) can be identified as candidates for removal from cache.

At 606, an exclusive local lock can be implemented over a defined lock that indicates interest in the object by at least one second node device of the group of node devices. The at least one second node device can be different than the first node device. Further, at 608, the object can be removed from the cache. In some implementations, implementing the local lock over the defined lock can comprise bypassing a coordinator node device of the group of node devices during the removing. Further, the exclusive local lock can be considered a shared lock by a cluster-wide coordinator node device and can be treated as an exclusive lock by an initiator of a local node device.

Figure 7:
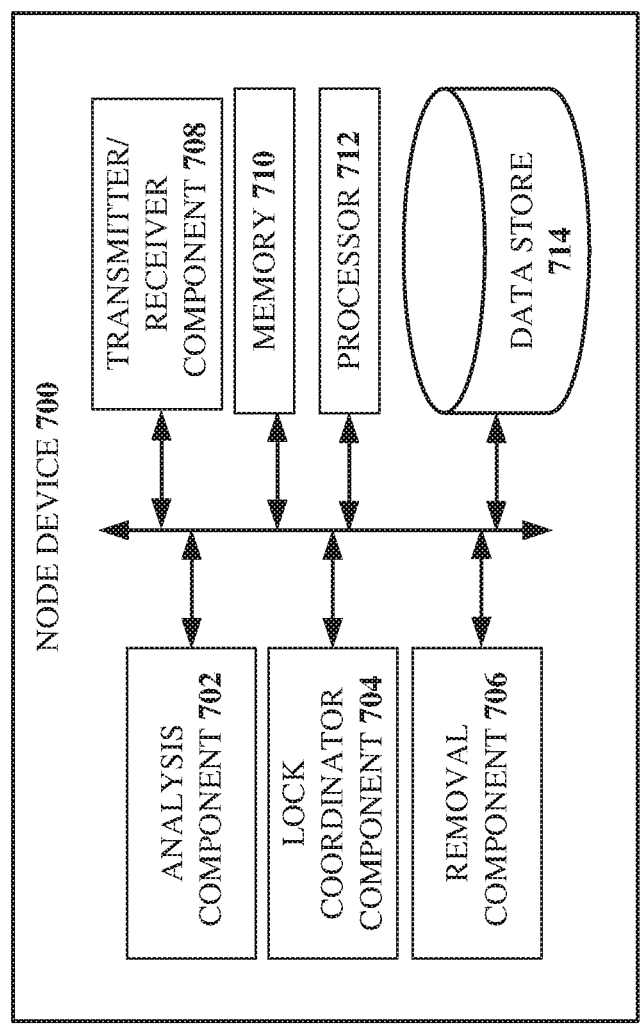
FIG. 7 illustrates an example, non-limiting, node device for managing lock resources in distributed file systems in accordance with one or more embodiments described herein.

FIG. 7 illustrates an example, non-limiting, node device 700 for managing lock resources in distributed file systems in accordance with one or more embodiments described herein. The node device 700 can comprise one or more of the components and/or functionality of the computing devices of FIG. 1 and/or the computer-implemented methods, and vice versa.

Aspects of devices (e.g., the node device 700 and the like), system, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the node device 700 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the node device 700 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The node device 700 can comprise an analysis component 702, a lock coordinator manager component 704, a removal component 706, a transmitter/receiver component 708, at least one memory 710, at least one processor 712, and at least one data store 714. The analysis component 702 can determine whether at least one resource is to be removed from a cache (e.g., the at least one memory 710, the at least one data store 714) of the node device 700. The at least one resource can be an object, such as a file stored on a distributed file system or another type of computer readable data stored on the distributed file system. Various criteria can be utilized to determine whether the object is scheduled to be removed from cache including explicit and/or implicit determinations.

Based on the determination by the analysis component 702 if the at least one resource is to be removed, the lock coordinator manager component 704 can implement an exclusive local lock over a defined lock. According to some implementations, the exclusive lock can be implemented over the defined lock prior to the determination that the resources is to be removed. The defined lock can indicate interest in the at least one resource by other node devices of the cluster of node devices other than the node device. In an example, the defined lock can be a null-type lock.

Further, upon or after the exclusive lock is implemented over the defined lock by the lock coordinator manager component 704, the removal component 706 can remove the at least one resource from the cache. The other nodes devices are not notified when the at least one resource is removed from the cache of the node device 700.

The at least one memory 710 can be operatively connected to the at least one processor 712. The at least one memory 710 can store executable instructions and/or computer executable components (e.g., the analysis component 702, the lock coordinator manager component 704, the removal component 706, the transmitter/receiver component 708, and so on) that, when executed by the at least one processor 712 can facilitate performance of operations (e.g., the operations discussed with respect to the various methods and/or systems discussed herein). Further, the at least one processor 712 can be utilized to execute computer executable components (e.g., the analysis component 702, the lock coordinator manager component 704, the removal component 706, the transmitter/receiver component 708, and so on) stored in the at least one memory 710.

For example, the at least one memory 710 can store protocols associated with facilitating exclusive local locks in distributed file systems as discussed herein. Further, the at least one memory 710 can facilitate action to control communication between the node device 700 and other node devices, one or more file storage systems, one or more devices, such that the node device 700 employ stored protocols and/or algorithms to achieve improved overall performance of distributed file systems as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 712 can facilitate respective analysis of information related to exclusive local locks as discussed herein. The at least one processor 712 can be a processor dedicated to analyzing and/or generating information received, a processor that controls one or more components of the node device 700, and/or a processor that both analyzes and generates information received and controls one or more components of the node device 700.

The transmitter/receiver component 708 can facilitate communication with another device or another node. The transmitter/receiver component 708 can be configured to transmit to, and/or receive data from, for example, log files, a defined entity, one or more other nodes, and/or other communication devices. Through the transmitter/receiver component 708, the node device 700 can concurrently transmit and receive data, can transmit and receive data at different times, or combinations thereof.

Figure 8:
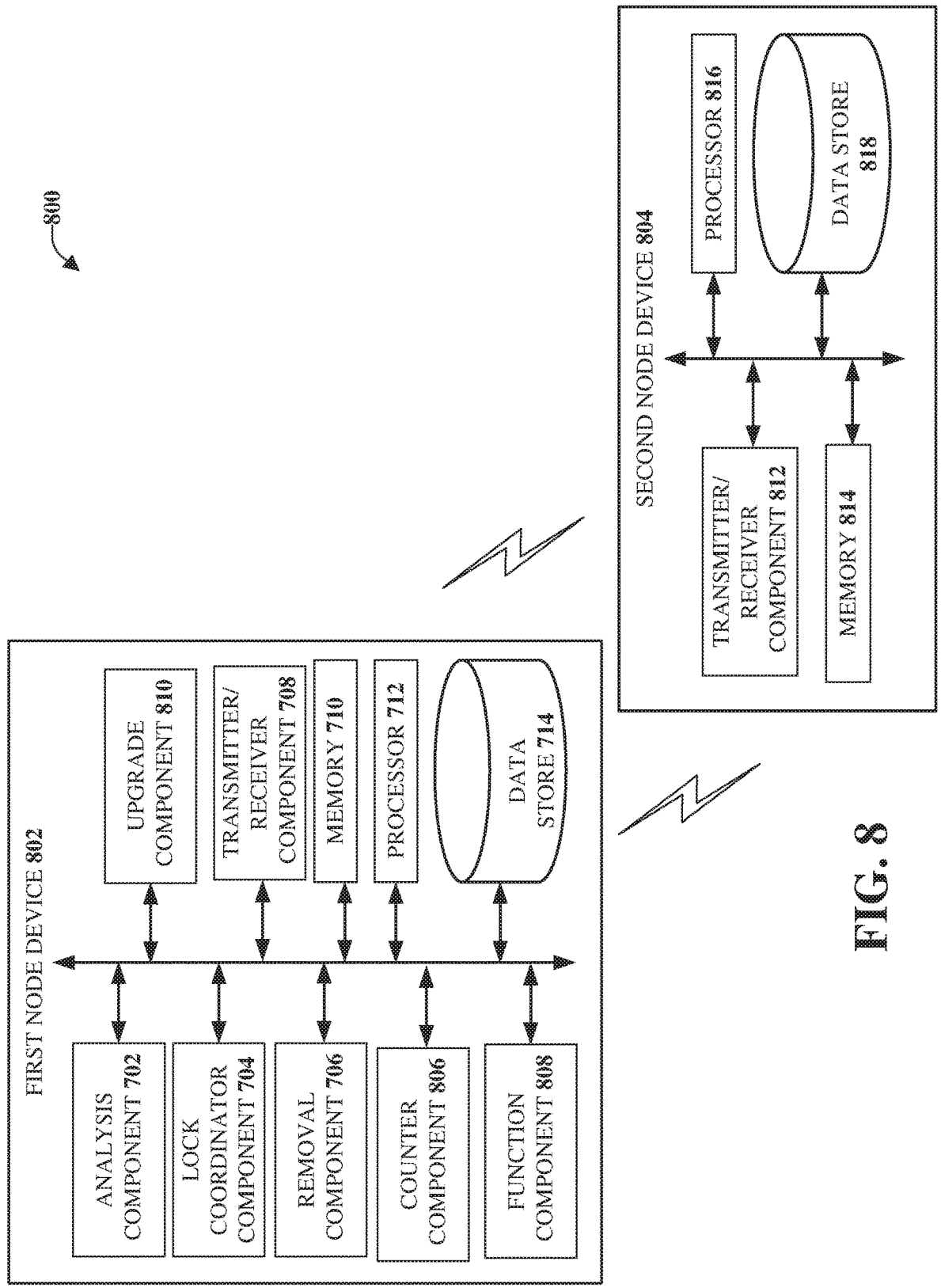
FIG. 8 illustrates another example, non-limiting, system for updating lock resources in distributed file systems in accordance with one or more embodiments described herein.

FIG. 8 illustrates an example, non-limiting, system 800 for updating lock resources in distributed file systems in accordance with one or more embodiments described herein. Repetitive description of like elements employed in other embodiments described herein is omitted for sake of brevity. The system 800 can comprise one or more of the components and/or functionality of the computing devices of FIG. 1, the computer-implemented methods, and/or the node device 700, and vice versa.

The system can comprise a first node device 802 and at least a second node device 804. The first node device 802 and the second node device 804 can be included in a cluster of node devices that can also comprise other node devices (not shown).

The first node device 802 can remove resources from local cache without notification to the second node device 804 or other node devices included in the cluster of node devices.

The lock coordinator manager component 704 can implement an exclusive local lock over a defined lock. The defined lock can be, for example, a null lock. Null locks already have a system definition (e.g., indicates interest in the resource, but does not prevent other processes and/or threads from locking the resource). A null lock has the advantage that the resource and its lock value are preserved, even when no processes and/or threads are locking the resource. Due to this predefined definition, overloading the null lock with the new context (e.g., the exclusive local lock) needs some consideration regarding the meaning of an exclusive local lock to the system in general. In addition, consideration should be given to handling cases where a null lock is not sufficiently powerful to perform the necessary work.

Accordingly, the first node device can include a counter component 806 that can determine that a reference count represented by a reference lock domain is zero. Upon or after the reference count drops to zero on a vnode, a function component 808 can call a function that can decide whether to delete the resource, write the dirty data associated with the resource back to disk, or just recycle the memory of the inode.

A delta read lock is sufficient to try to delete the inode under, but a null lock is not sufficient. Therefore, an exclusive local lock implemented over a null lock can optionally be updated first. It is noted that this path is not always taken. Best case performance is still significantly better than asking the coordinator for every lock, and worst case performance is no worse.

In order to do this, a flag is kept on the inode, which is set when a reference lock on that inode is contended with (e.g., a thread tried to take an exclusive reference lock). A contention callback can be added to the reference lock domain to trigger on lock contention that sets this flag. It is not necessary to relinquish the shared reference lock. Instead, when this shared lock is later dropped, and the reference count goes to zero, a check to the set flag (e.g., in bam_inactive) can be performed. Thereafter, an upgrade component 810 can upgrade the exclusive local lock only if that flag is set. This can improve a workflow around reference locks and can make it possible to use a null lock in this context.

As illustrated, the second node device 804 can include at least one transmitter/receiver component 812, at least one memory 814, at least one processor 816, and at least one data store 818. The at least one memory 814 can be operatively connected to the at least one processor 816. The at least one memory 814 can store executable instructions and/or computer executable components that, when executed by the at least one processor 816 can facilitate performance of operations. Further, the at least one processor 816 can be utilized to execute computer executable components stored in the at least one memory 814.

For example, the at least one memory 814 can store protocols associated with facilitating exclusive local locks in distributed file system as discussed herein. Further, the at least one memory 814 can facilitate action to control communication between the second node device 804, the first node device 802, and other node devices, one or more file storage systems, one or more devices, such that the second node device 804 can employ stored protocols and/or algorithms to achieve improved overall performance of distributed file systems as described herein.

The at least one processor 816 can facilitate respective analysis of information related to exclusive local locks. The at least one processor 816 can be a processor dedicated to analyzing and/or generating information received, a processor that controls one or more components of the second node device 804, and/or a processor that both analyzes and generates information received and controls one or more components of the second node device 804.

The at least one transmitter/receiver component 812 can output the upgrade request, and/or the indictor, to the first node device 802 or to another device or another node. The at least one transmitter/receiver component 812 can be configured to transmit to, and/or receive data from, for example, log files, a defined entity, one or more other nodes, and/or other communication devices. Through the at least one transmitter/receiver component 812, the second node device 804 can concurrently transmit and receive data, can transmit and receive data at different times, or combinations thereof.

In addition, it is noted that the second node device 804 can include one or more of the components and/or functionality of the first node device 802. Further, the first node device 802 can include one or more of the components and/or functionality of the second node device 804.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
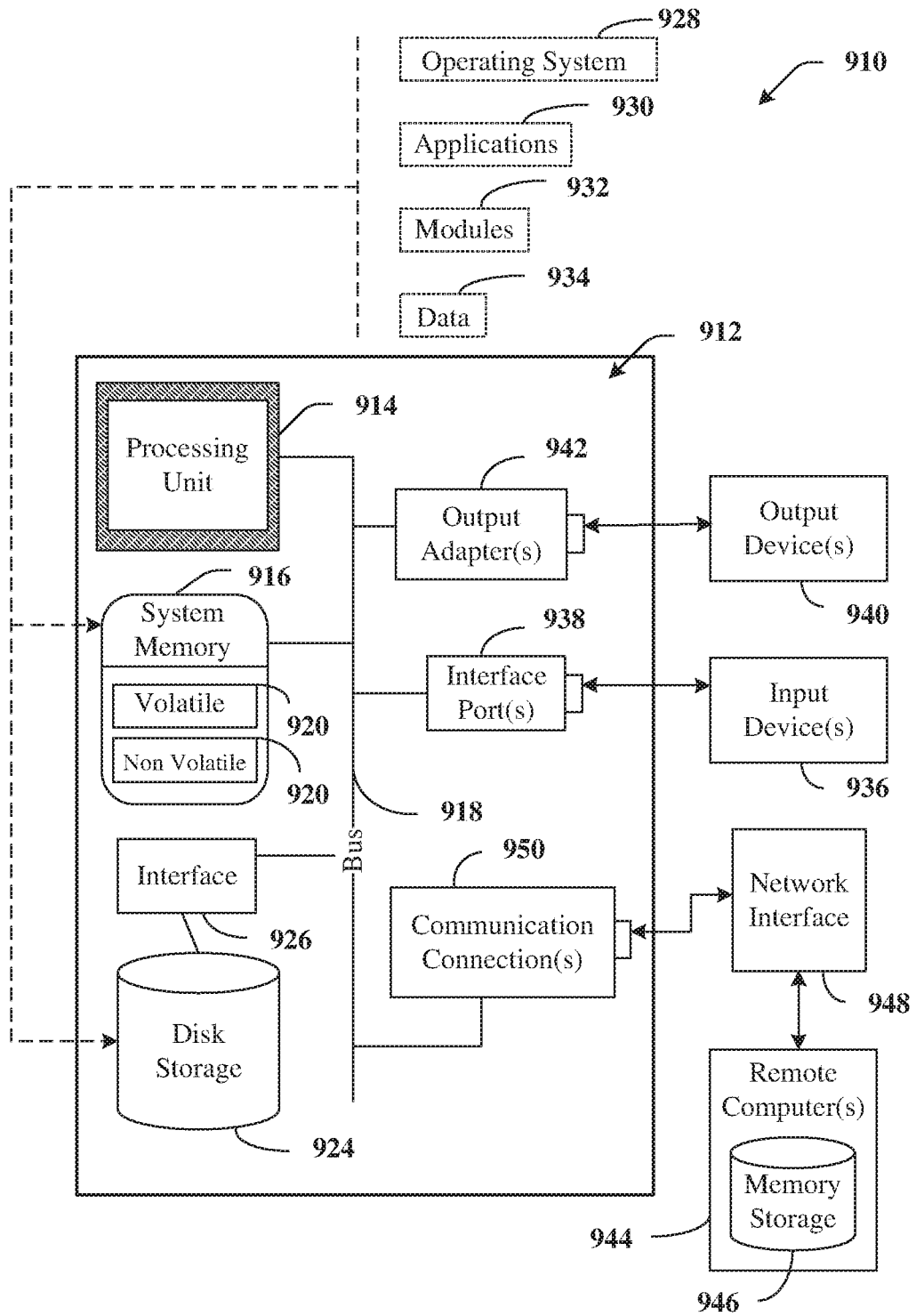
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
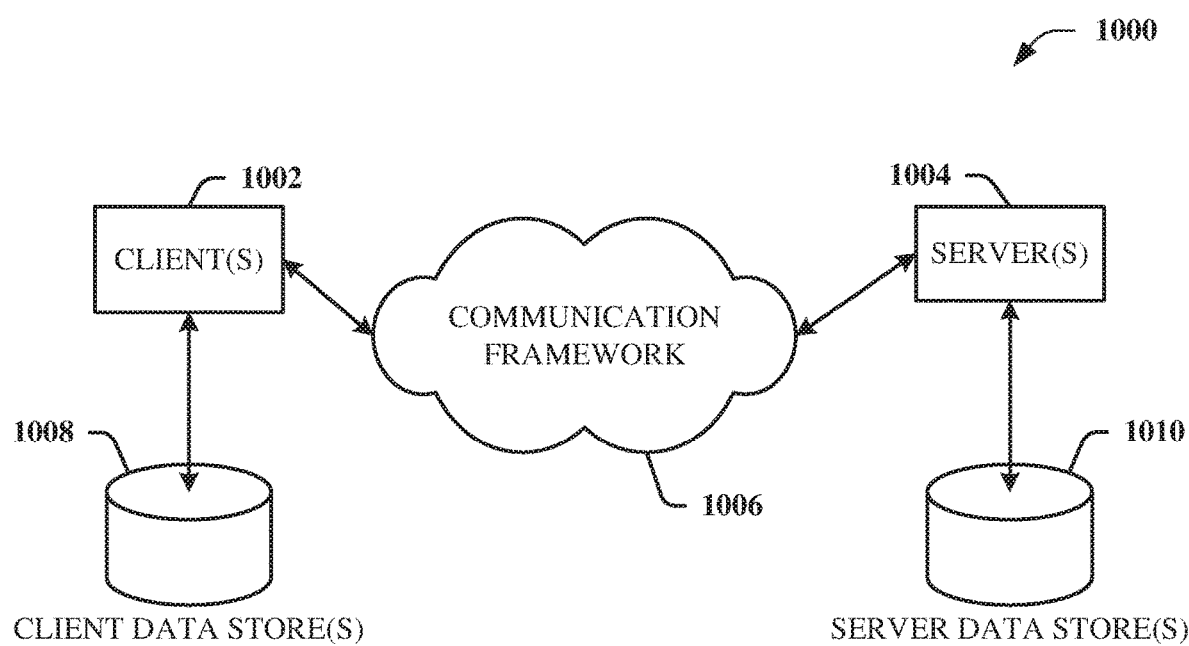
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A node device of a cluster of node devices, comprising:
a processor; and
a memory that stores executable instructions that, when executed by the processor, facilitate performance of operations, comprising:
determining that at least one resource is to be removed from a cache of the node device based on receipt of an explicit request for removal of the at least one resource;
implementing an exclusive local lock over a null lock with a defined contention type, wherein the null lock indicates interest in the at least one resource by other node devices of the cluster of node devices other than the node device, and wherein the defined contention type indicates that the exclusive local lock is to be treated as an exclusive lock locally and is to be treated as a shared lock by a coordinator node; and
removing the at least one resource from the cache, wherein the other node devices are not notified of the removing, wherein the cluster of node devices comprises the coordinator node, and wherein the implementing facilitates bypass of a call to the coordinator node during the removing.

2. The node device of claim 1, wherein the removing comprises:
determining that a reference count represented by a reference lock domain is zero; and
in response to the determining that the reference count is zero, executing a function that processes the at least one resource according to a defined procedure.

3. The node device of claim 2, wherein the operations further comprise:
upgrading the exclusive local lock based on an activation of a contention callback indicator.

4. The node device of claim 3, wherein the contention callback indicator is triggered based on lock contention.

5. The node device of claim 2, wherein the executing the function comprises deleting the at least one resource.

6. The node device of claim 2, wherein the executing the function comprises writing information related to the at least one resource to a storage device.

7. The node device of claim 2, wherein the executing the function comprises recycling the memory of the node device.

8. The node device of claim 1, wherein the at least one resource is at least one file stored on a distributed file system.

9. The node device of claim 1, wherein the cluster of node devices is representative of nodes of a distributed file system.

10. A method, comprising:
    determining, by a node comprising a processor and part of a group of nodes, that an object is to be unlinked at the node;
    implementing, by the node, an exclusive local lock over a null lock with a defined contention type indicating interest in the object, wherein, based on the defined contention type, the exclusive local lock is treated as a shared lock by a coordinator node; and
    unlinking, by the node, the object at the node, wherein the implementing facilitates, during the unlinking, bypassing a call to the coordinator node, and wherein the coordinator node is included in the group of nodes.

11. The method of claim 10, wherein the exclusive local lock is further treated as the shared lock by a cluster-wide coordinator node and is treated as an exclusive lock by an initiator of a local node.

12. The method of claim 10, wherein a first defined strength of the exclusive local lock on a local node is similar to a second defined strength of the shared lock or a delta lock at a cluster-wide coordinator node.

13. The method of claim 10, wherein the determining comprises clearing cache during a shutdown operation performed at the node.

14. The method of claim 10, further comprising:
    prior to the implementing, determining, by the node, that a context of an operation being performed on the object is an operation local to the node.

15. The method of claim 10, wherein the null lock allows one or more processes to lock the object.

16. The method of claim 10, wherein the determining that the object is to be unlinked comprises receiving a command to delete the object.

17. The method of claim 10, wherein the determining is based on detection of inactivity of the object at the node and a determination that the object is accessible via a second node included in the group of nodes of a distributed file system.

18. A non-transitory machine-readable medium, comprising executable instructions that, when executed by a processor, facilitate performance of operations, comprising:
    determining that a cache is to be released from a first node device of a group of node devices;
    identifying an object for removal from the cache;
    determining whether a contention callback is assigned to the object;
    implementing an exclusive local lock over a null lock with a defined contention type, wherein the exclusive local lock being implemented over the null lock indicates interest in the object by at least one second node device of the group of node devices, the at least one second node device being different than the first node device, and wherein, based on the null lock having the defined contention type, the exclusive local lock is considered locally as an exclusive lock and is considered as a shared lock by a coordinator node device; and
    removing the object from the cache, wherein the implementing enables bypassing a call to the coordinator node device of the group of node devices during the removing.

19. The non-transitory machine-readable medium of claim 18, wherein the exclusive local lock is considered the shared lock by a cluster-wide coordinator node device and is treated as the exclusive lock by an initiator of a local node device.

20. The non-transitory machine-readable medium of claim 18, wherein the determining comprises clearing the cache during a shutdown operation performed at the first node device.

* * * * *